(12) United States Patent
Jeong

(10) Patent No.: US 11,634,181 B2
(45) Date of Patent: Apr. 25, 2023

(54) DRAINING STRUCTURE FOR COWL

(71) Applicants: Hyundai Motor Company, Seoul (KR); Kia Corporation, Seoul (KR)

(72) Inventor: Song Jae Jeong, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/486,047

(22) Filed: Sep. 27, 2021

(65) Prior Publication Data
US 2022/0194479 A1    Jun. 23, 2022

(30) Foreign Application Priority Data

Dec. 22, 2020  (KR) .......................... 10-2020-0180876

(51) Int. Cl.
*B62D 25/08*    (2006.01)
*B62D 25/24*    (2006.01)

(52) U.S. Cl.
CPC ........... *B62D 25/081* (2013.01); *B62D 25/24* (2013.01)

(58) Field of Classification Search
CPC ........ B62D 25/081; B62D 25/24; B60R 13/07
USPC .................................................. 296/192, 208
See application file for complete search history.

(56) References Cited

U.S. PATENT DOCUMENTS

| 4,332,187 A * | 6/1982 | Imai ................. B60H 1/28 296/192 |
| 2014/0117722 A1* | 5/2014 | Lacroix ............. B62D 25/081 296/192 |
| 2014/0375084 A1* | 12/2014 | Le Roy ............... B60H 1/28 296/192 |
| 2019/0176896 A1* | 6/2019 | Anegawa ........... B62D 25/081 |

FOREIGN PATENT DOCUMENTS

| EP | 0947415 A2 * | 4/1999 | |
| EP | 1084936 A2 * | 3/2001 | ............. B62D 25/04 |
| FR | 2963920 A1 * | 2/2012 | ............. B60R 13/07 |
| JP | 2543598 B2 * | 10/1989 | |
| JP | H0789458 A * | 4/1995 | |
| JP | H10218026 A * | 8/1998 | |
| JP | H11129939 A * | 5/1999 | |
| JP | 3928196 B2 * | 6/2007 | |
| JP | 4075840 B2 * | 4/2008 | |
| KR | 100521676 B1 | 10/2005 | |
| WO | WO-2011043135 A1 * | 4/2011 | ........... B62D 25/081 |

OTHER PUBLICATIONS

Machine translation of JP-H11129939-A.*

* cited by examiner

*Primary Examiner* — Dennis H Pedder
*Assistant Examiner* — Kevin P Weldon
(74) *Attorney, Agent, or Firm* — Slater Matsil, LLP

(57) ABSTRACT

An embodiment cowl drainage structure includes a lower inner member, a lower outer member disposed outside the lower inner member and coupled to the lower inner member so as define a closed space therebetween, and an upper outer member coupled to both the lower outer member and the (Continued)

lower inner member, wherein the upper outer member includes a main hole, and wherein a portion of a space defined between the upper outer member and the lower inner member is configured to communicate fluidly with an outside.

20 Claims, 11 Drawing Sheets

DRAINING STRUCTURE FOR COWL

CROSS-REFERENCE TO RELATED APPLICATIONS

This application claims the benefit of Korean Patent Application No. 10-2020-0180876, filed on Dec. 22, 2020, which application is hereby incorporated herein by reference.

TECHNICAL FIELD

The present disclosure relates to a cowl drainage structure for a vehicle.

BACKGROUND

The term "cab-forward" as used in vehicle design means a style of vehicle design in which A-pillars are displaced to a forward location so as to maximize the space inside the vehicle.

As illustrated in FIG. 1A, the angle between a hood 510' and a windshield glass 520' in the cab-forward design is greatly increased, compared to the angle between a hood 510 and a windshield glass 520 in a conventional design. In the cab-forward design, since the angle between the hood 510' and the windshield glass 520' is increased, air resistance is reduced, and the amount of internal space in the front for a passenger sitting on a front seat is increased, thereby improving merchantability. However, because the cowl point is displaced further forwards than in a conventional design (the cowl point is displaced to P2 from P1 in the cab-forward design), the amount of space in the engine compartment is reduced, and the distance between a dash panel and the end of a cowl panel is increased, thereby deteriorating performance of alleviation of NVH (noise, vibration and harshness).

The cowl serves to introduce external air into a vehicle interior for ventilation of the vehicle, and to discharge water, which accumulates therein during rainy weather or when washed. The cowl, which is a cross member connecting right and left front pillars to each other, plays a critical role in ensuring the torsional rigidity and transverse bending rigidity of a vehicle. Furthermore, because the cowl supports a windshield glass, wipers, a steering column and the like, the cowl is an element that plays a critical role in alleviation of NVH.

As illustrated in FIGS. 1B and 1C, because the length L1 of a cowl of a conventional vehicle is relatively short, sufficient space to assemble components is ensured. In contrast, because the cowl point of a cab-forward design vehicle is displaced forwards and thus the length L2 of the cowl is increased, the amount of space required to assemble components in the engine compartment is reduced. To increase the assembly space as indicated by S2', a process of cutting a portion of the cowl, assembling the components in the engine compartment and providing an additional component 530 may be applied. In this case, although the assembly space may be increased to S2' from S2, NVH alleviation performance is deteriorated due to assembly of the additional component.

In addition, owing to characteristics of the cab-forward design, the length L2 between the dash panel and the end of the cowl panel is greatly increased, compared to a conventional design, and NVH alleviation performance is deteriorated. In order to minimize the deterioration of NVH alleviation performance, the cowl panel having the increased length is coupled to a fender apron member.

Referring to FIG. 2A, as described above, in order to improve the NVH alleviation performance of the cowl, the drainage structure of the cowl 540 is connected to the fender apron member 550 having an increased size. Here, because large holes must be formed in outer and inner portions of the fender apron member 550, which greatly contributes to improvement in collision performance and alleviation of NVH, the size of a drain hole 560 must be greatly decreased. As illustrated by the arrow in FIG. 2B, a drainage structure of a conventional vehicle is configured so as to be formed through the outer and inner portions of the fender apron member 550. Hence, there is a problem in that water falls not only to the outside of the fender apron member 550 but also the inside of the fender apron member 550 (see the shaded region in FIG. 2B). For this reason, corrosion may occur at the inner portion of the fender apron member 550, and collision performance may be deteriorated due to the decreased thickness of the fender apron member 550.

Korean Patent Registration Publication No. 10-0521676 describes information related to the present subject matter.

The above information disclosed in this Background section is only for enhancement of understanding of the background of the invention and therefore it may contain information that does not form the prior art that is already known to a person of ordinary skill in the art.

SUMMARY

The present disclosure relates to a cowl drainage structure for a vehicle. Particular embodiments relate to a cowl drainage structure constructed to isolate a drainage path from a collision path in order to prevent corrosion and to improve drainage performance.

Embodiments of the present invention can solve problems associated with the prior art. An embodiment of the present invention provides a cowl drainage structure capable of preventing corrosion of a fender apron member.

Another embodiment of the present invention provides a cowl drainage structure having excellent drainage performance.

Particularly, a further embodiment of the present invention provides a cowl drainage structure capable of preventing corrosion of a fender apron member, which frequently occurs in a vehicle to which a cab-forward design is applied.

The features of embodiments of the present invention are not limited to the above-mentioned features, and other features of embodiments of the present invention, which are not mentioned above, will be clearly understood by those skilled in the art, to which the present invention belongs, from the following descriptions of preferred embodiments.

One embodiment of the present invention provides a cowl drainage structure including a lower inner member, a lower outer member, which is disposed outside the lower inner member and is coupled to the lower inner member so as to define a closed space therebetween, and an upper outer member, which is coupled both to the lower outer member and to the lower inner member and has therein a main hole, wherein a portion of the space defined between the upper outer member and the lower inner member communicates with the outside.

Another embodiment of the present invention provides a cowl drainage structure including a lower inner member connected to a cowl, a lower outer member, which is disposed outside the lower inner member and is coupled to the lower inner member so as to define a closed space therebetween, and an upper outer member, which is coupled both to the lower outer member and to the lower inner member and has therein a main hole, wherein a space defined between the upper outer member and the lower inner member communicates with the cowl.

Other aspects and preferred embodiments of the invention are discussed infra.

It is to be understood that the term "vehicle" or "vehicular" or other similar term as used herein is inclusive of motor vehicles in general, such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative-fuel vehicles (e.g. fuels derived from resources other than petroleum). As referred to herein, a hybrid vehicle is a vehicle that has two or more sources of power, for example, a vehicle powered by both gasoline and electricity.

The above and other features of embodiments of the invention are discussed infra.

BRIEF DESCRIPTION OF THE DRAWINGS

The above and other features of embodiments of the present invention will now be described in detail with reference to certain exemplary embodiments thereof, illustrated in the accompanying drawings which are given hereinbelow by way of illustration only, and thus are not limitative of the present invention, and wherein.

Figure 1A:
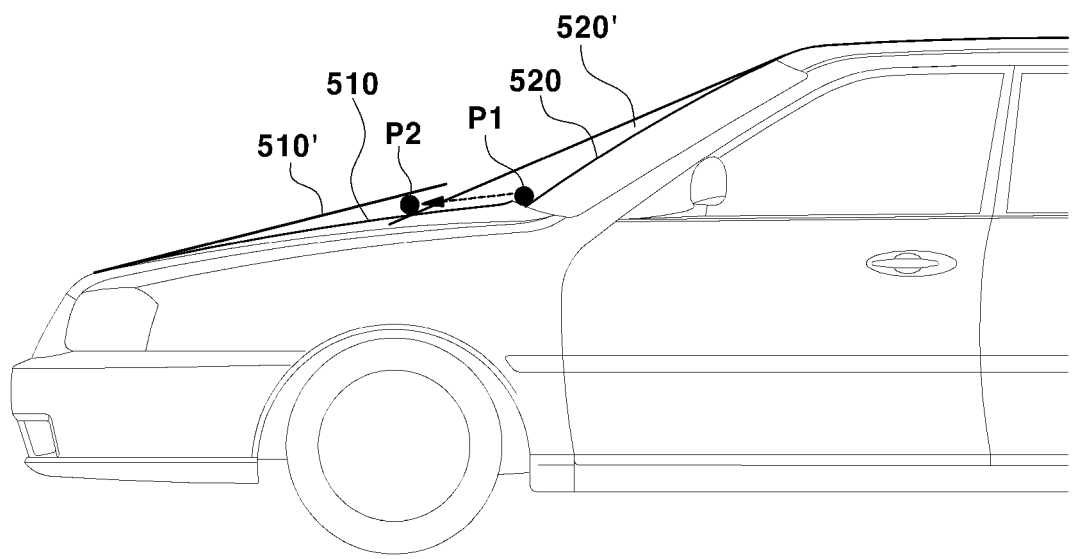
FIG. 1A is a view illustrating displacement of a cowl point between a vehicle having a conventional design and a vehicle having a cab-forward design.
Figure 1B:
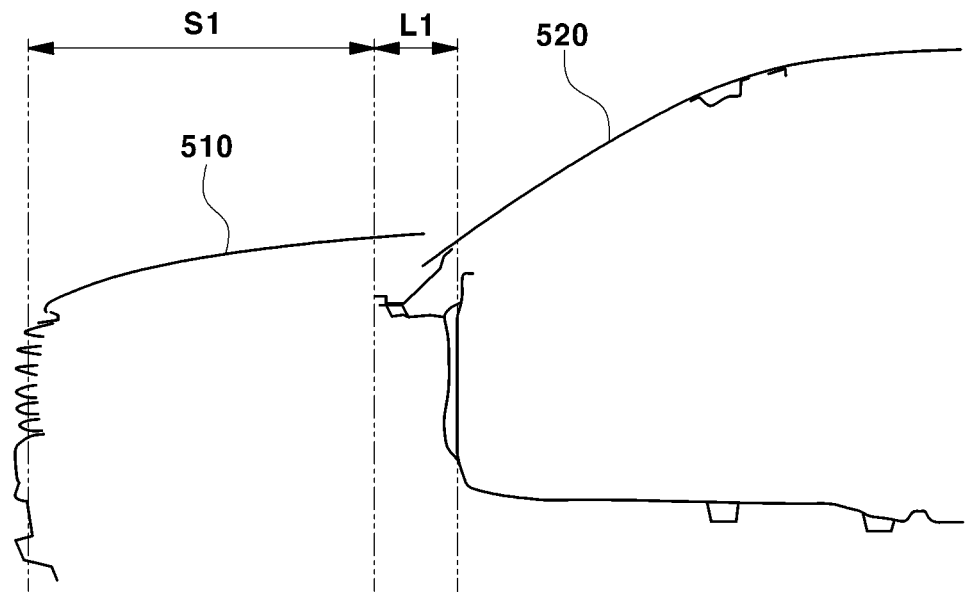
FIGS. 1B and 1C are views showing comparison of the length of a cowl and of the assembly space in an engine compartment between a vehicle having a conventional design and a vehicle having a cab-forward design.
Figure 1C:
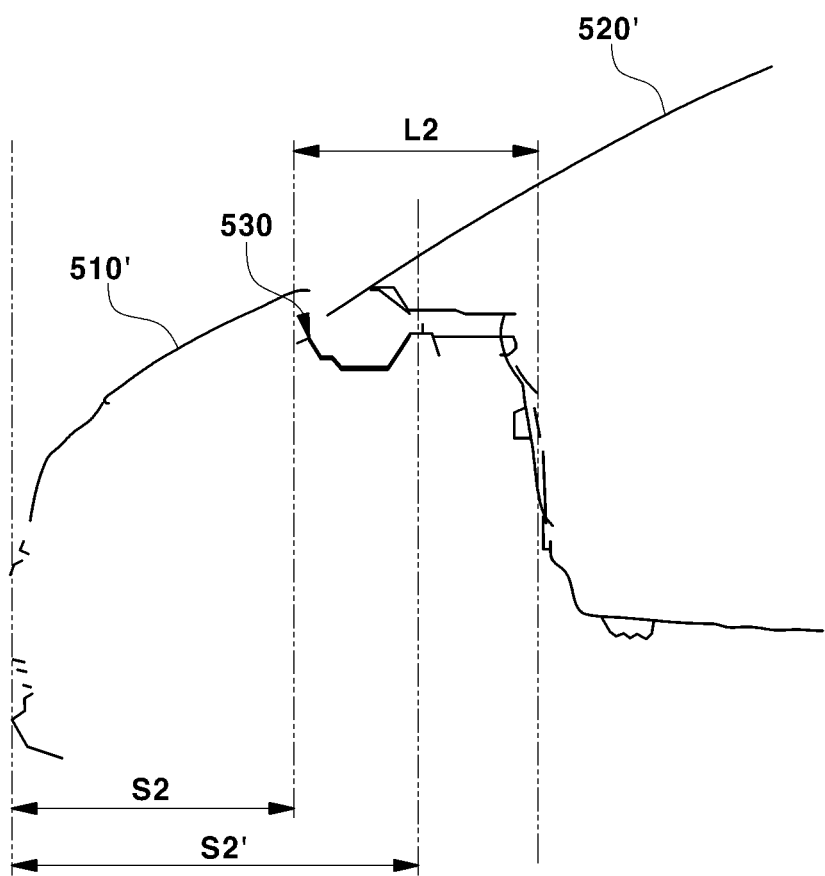
Figure 2A:
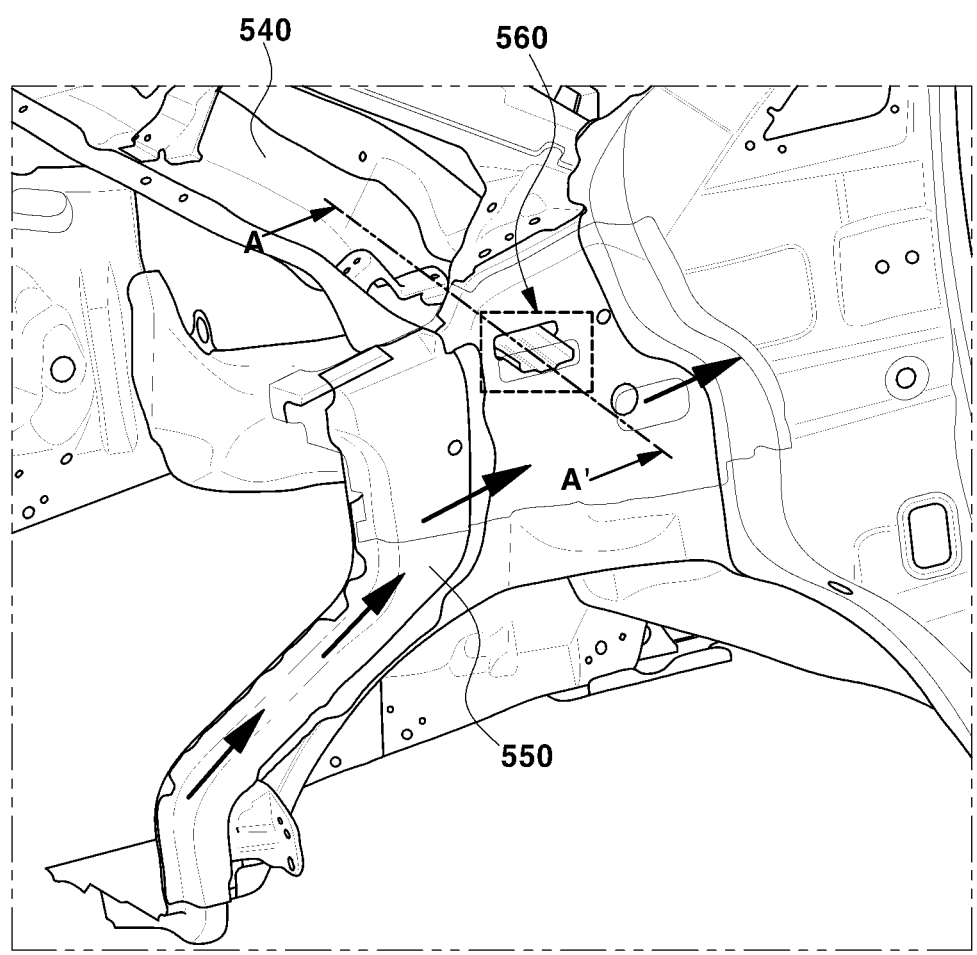
FIG. 2A is a view illustrating a drainage structure connected to a cowl of a vehicle having a conventional cab-forward design.
Figure 2B:
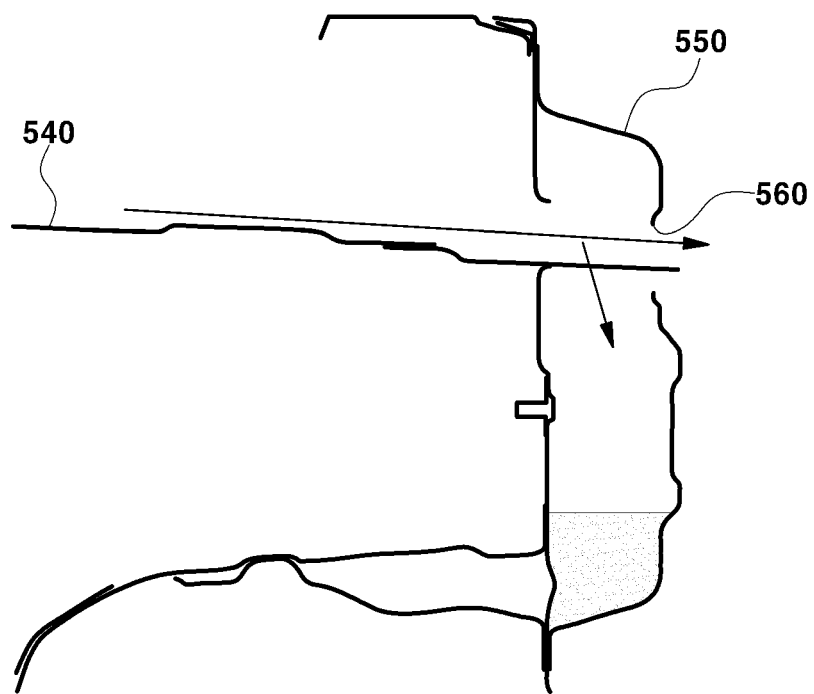
FIG. 2B is a schematic cross-sectional view taken along line A-A' of FIG. 2A.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes, will be determined in part by the particular intended application and use environment.

In the figures, the reference numbers refer to the same or equivalent parts of embodiments of the present invention throughout the several figures of the drawing.

DETAILED DESCRIPTION OF ILLUSTRATIVE EMBODIMENTS

Specific structural and functional descriptions of embodiments of the present invention disclosed herein are only for purposes of illustration of the embodiments of the present invention. The present invention may be embodied in many different forms without departing from the spirit and significant characteristics of the present invention. The present invention should not be construed as being limited to the embodiments stated in this specification, but should be construed as including various alternatives, modifications and equivalents that may be included within the spirit and scope of the present invention as defined by the appended claims.

It will be understood that, although the terms "first", "second", etc. may be used herein to describe various elements, the corresponding elements should not be understood to be limited by these terms, which are used only to distinguish one element from another. For example, within the scope defined by the concept of embodiments of the present invention, a first element may be referred to as a second element, and similarly, a second element may be referred to as a first element.

It should be understood that, when an element is referred to as being "connected with" another element, there may be intervening elements present, or the element may be directly connected with the another element. In contrast, it should be understood that, when an element is referred to as being "directly connected with" another element, there are no intervening elements present. Other expressions that explain the relationships between elements, such as "between," "directly between," "adjacent to," or "directly adjacent to," should be understood in the same way.

Wherever possible, the same reference numbers will be used throughout the drawings to refer to the same or like parts. The terminology used throughout this specification is for the purpose of describing particular embodiments only, and is not intended to limit the present invention. As used in the disclosure and the appended claims, the singular forms are intended to include the plural forms as well, unless the context clearly indicates otherwise. It will be further understood that the terms "comprises" and/or "comprising", when used in this specification, specify the presence of stated components, steps, operations, and/or elements, but do not preclude the presence or addition of one or more other components, steps, operations, and/or elements.

According to embodiments of the present invention, since a vehicle is provided with an improved drainage structure associated with a cowl, it is possible to improve corrosion resistance and collision performance.

According to embodiments of the present invention, because a collision load path is isolated from a drainage path, it is possible to prevent the possibility of corrosion, and it is possible to prevent deterioration of collision performance resulting from such corrosion.

Furthermore, according to embodiments of the present invention, since a fender apron member is divided into a member contributing to improvement of collision performance and a member contributing to improvement of NVH alleviation performance, and an inner drain hole and an outer drain hole are spaced apart from each other in the longitudinal direction of a vehicle, it is possible to increase the size of the drain hole without adverse influence on NVH alleviation performance. Accordingly, it is possible to realize more efficient drainage.

Hereinafter, embodiments of the present invention will be described in detail with reference to the accompanying drawings.

As illustrated in FIGS. 3 to 9, the cowl drainage structure according to embodiments of the present invention may include a lower inner member 20, a lower outer member 40, an upper outer member 60 and an upper inner member 80.

The lower inner member 20 guides water or the like, which flows from a cowl 10, to the outside of a vehicle. The lower inner member 20 is connected to the cowl 10, and is attached to the vehicle body. In an embodiment of the present invention, the lower inner member 20 may be attached to the shock absorber housing of the vehicle. However, those skilled in the art will understand that the position at which the lower inner member 20 is attached to the vehicle body may be changed depending on the position of the cowl 10, which differs depending on the vehicle type. In an embodiment of the present invention, the lower inner member 20 includes a guide portion 22, a vertical portion 24 and a base portion 26.

The guide portion 22 is disposed so as to be in direct contact with the cowl 10, and is connected thereto. Specifically, the guide portion 22 may be disposed beneath the cowl 10 so as to overlap the cowl 10. The curvature of the surface of the guide portion 22 may be the same as the curvature of the surface of the cowl 10.

The vertical portion 24 extends from the guide portion 22 in a substantially downward direction. The phrase "extension in a substantially downward direction" does not mean an exact right angle with respect to the horizontal direction but means extension in a generally vertical direction.

The base portion 26 is bent from the vertical portion 24 to a predetermined angle and extends therefrom. The base portion 26 is bent approximately perpendicularly to the vertical portion 24 and extends therefrom.

The lower outer member 40 is coupled to the lower inner member 20. The lower outer member 40 is coupled to the lower inner member 20 so as to define a closed space 41 therebetween. Hence, because the lower inner member 20 defines a collision load path and prevents infiltration of water thereinto, the lower inner member 20 has excellent corrosion resistance and collision performance. In an embodiment of the present invention, the lower outer member 40 includes a support portion 43, an extension portion 45, an upper flange 47 and a lower flange 49.

The support portion 43 and the extension portion 45 define the closed space 41 in conjunction with the vertical portion 24 and the base portion 26 of the lower inner member 20. The support portion 43 may be formed so as to be substantially perpendicular to the extension portion 45. The support portion 43 may extend in a substantially horizontal direction, and the extension portion 45 may be bent from the support portion 43, and may extend in a substantially vertical direction.

The upper flange 47 is bent from the support portion 43 in a direction substantially perpendicular to the support portion 43 and extends therefrom, and the lower flange 49 is bent from the extension portion 45 in a direction substantially perpendicular to the extension portion 45 and extends therefrom. In an embodiment of the present invention, the upper flange 47 may be attached to the vertical portion 24, and the lower flange 49 may be attached to the base portion 26.

The upper outer member 60 is supported by the lower outer member 40, and defines a space 61 in conjunction with the lower inner member 20. The lower end of the upper outer member 60 is coupled to the lower outer member 40, and a portion of the upper end of the upper outer member 60 is coupled to the lower inner member 20. A portion of the space between the upper outer member 60 and the lower inner member 20 may communicate with the outside. Specifically, the portion of the space between the upper outer member 60 and the lower inner member 20 may communicate with the cowl 10, and rain water or the like from the cowl 10 may enter the space 61 through a portion of the space between the upper outer member 60 and the lower inner member 20.

The upper outer member 60 has therein a main hole 63, through which water or the like, which is introduced into the space defined between the upper outer member 60 and the lower inner member 20, is discharged. The main hole 63 may be formed in a lower region of the upper outer member 60, and may be disposed adjacent to the lower outer member 40. The main hole 63 is formed in the upper outer member 60 at a position that is offset from the lower inner member 20 or the guide portion 22 by a predetermined distance. Specifically, the drainage path, which is defined by the cowl 10 and the guide portion 22, and the main hole 63 may be parallel to each other such that the drainage path is bent twice. In an embodiment of the present invention, the upper outer member 60 has at least one subsidiary hole 65 formed at a position that is spaced apart from the main hole 63 by a predetermined distance. The subsidiary hole 65 may be formed at a position adjacent to the guide portion 22, and may overlap the guide portion 22, with a predetermined distance therebetween. Preferably, the main hole 63 may have an area larger than the area of the subsidiary hole 65, and the subsidiary hole 65 in the upper outer member 60 may be positioned higher than the main hole 63. Accordingly, when an excessive amount of rain water is introduced into the space 61, the rain water is also discharged through the subsidiary hole 65, thereby ensuring superior drainage performance.

The upper outer member 60 includes an upper connector 67 constituting the periphery of the upper portion thereof. A portion of the upper connector 67 is connected to the lower inner member 20, and another portion of the upper connector 67 is connected to the vehicle body. In an embodiment of the present invention, the vehicle body may be a cowl extension (not shown), and the other portion of the upper connector 67 may be attached to a portion of the vehicle body other than the cowl extension, depending on the vehicle type.

The upper outer member 60 may include a flange portion 69, which constitutes the periphery of the lower portion thereof and is bent from the upper outer member 60. The flange portion 69 may be bent to the same angle as the angle of a coupling surface of the lower outer member 40 so as to be coupled to the lower outer member 40.

In some embodiments of the present invention, the cowl drainage structure includes the upper inner member 80. A portion of the upper inner member 80 is coupled to the lower inner member 20. Another portion of the upper inner member 80 is connected to the vehicle body. As described above, the vehicle body may be a cowl extension, and may differ depending on the vehicle type.

The upper inner member 80 has therein a plurality of openings 82. The plurality of openings 82 may be disposed so as to overlap the guide portion 22, with a predetermined distance therebetween. Rain water or the like may flow to the outside of the vehicle through the cowl 10, the guide portion 22 and the openings 82.

Figure 3:
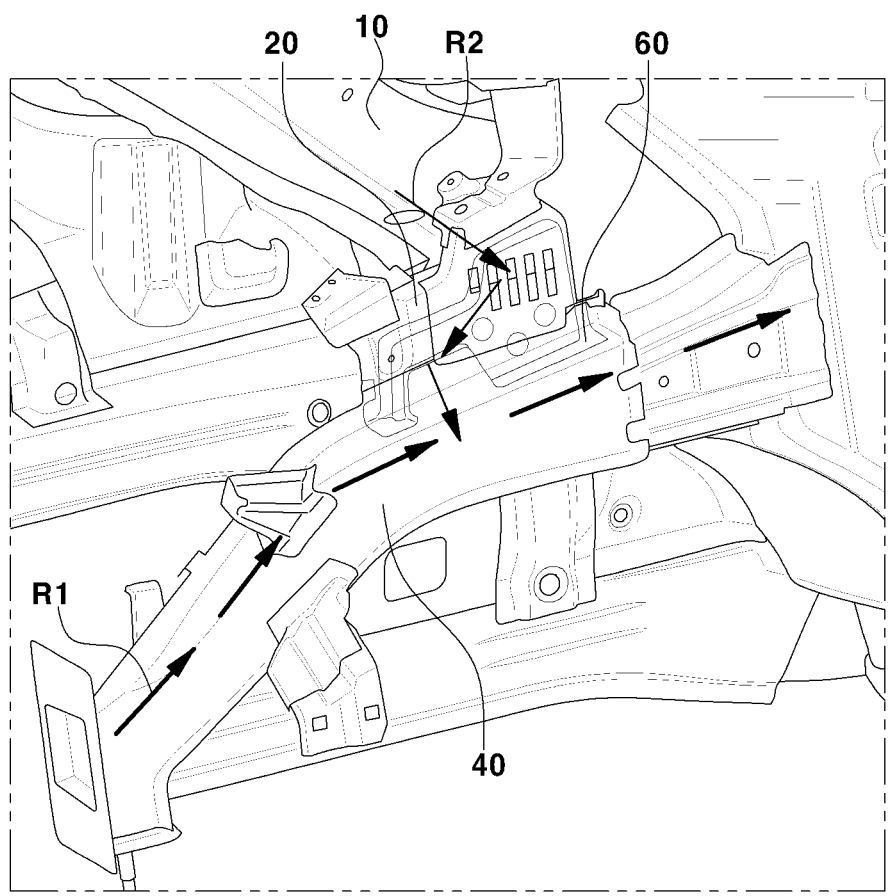
FIG. 3 is a view illustrating a cowl drainage structure according to embodiments of the present invention.
Figure 4:
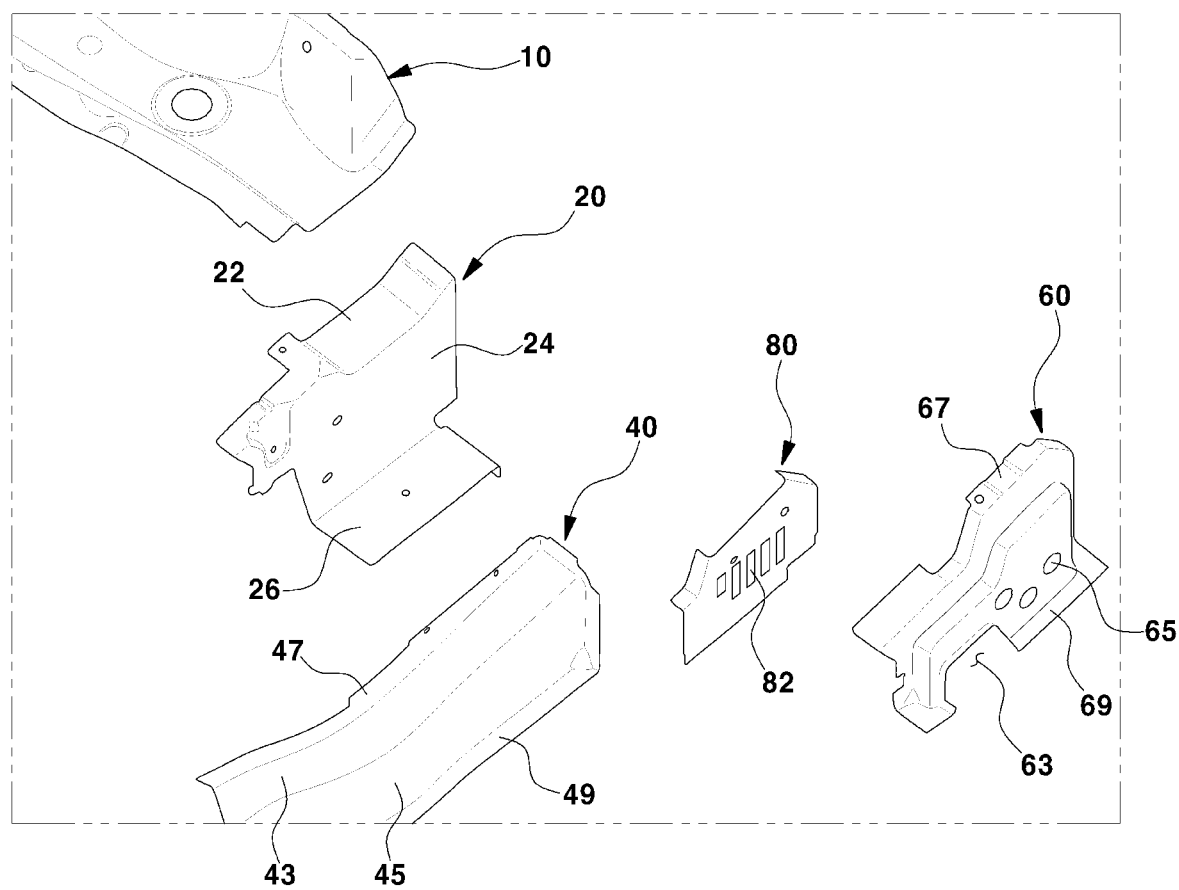
FIG. 4 is an exploded perspective view of the cowl drainage structure according to embodiments of the present invention.
Figure 5:
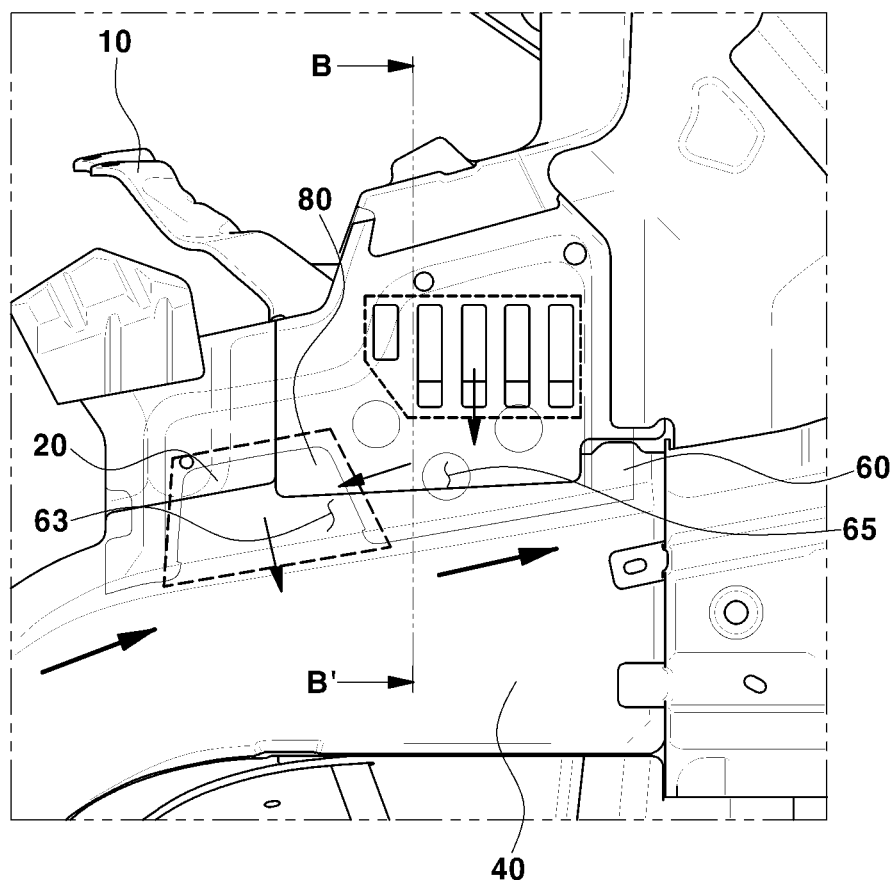
FIG. 5 is a front view of the cowl drainage structure according to embodiments of the present invention.
Figure 6:
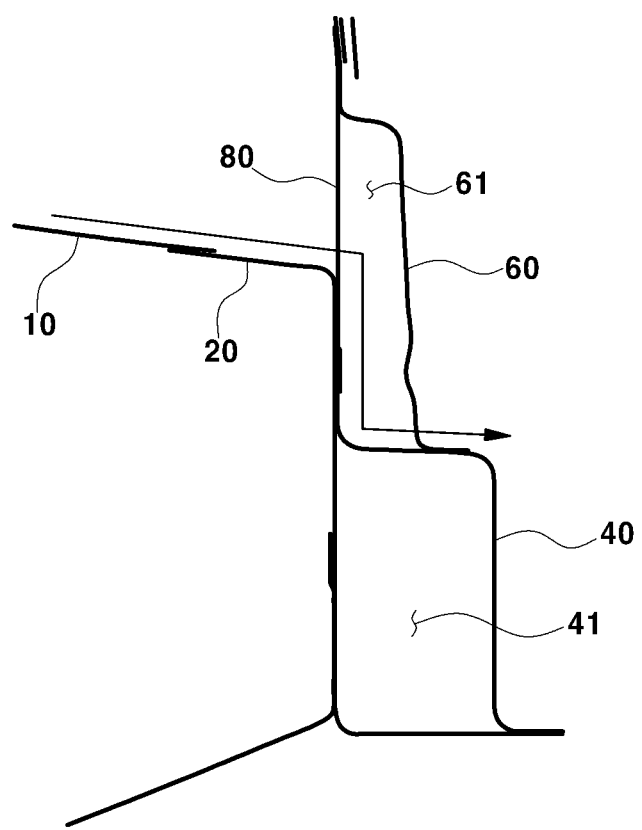
FIG. 6 is a schematic cross-sectional view taken along line B-B' of FIG. 5.
Figure 7:
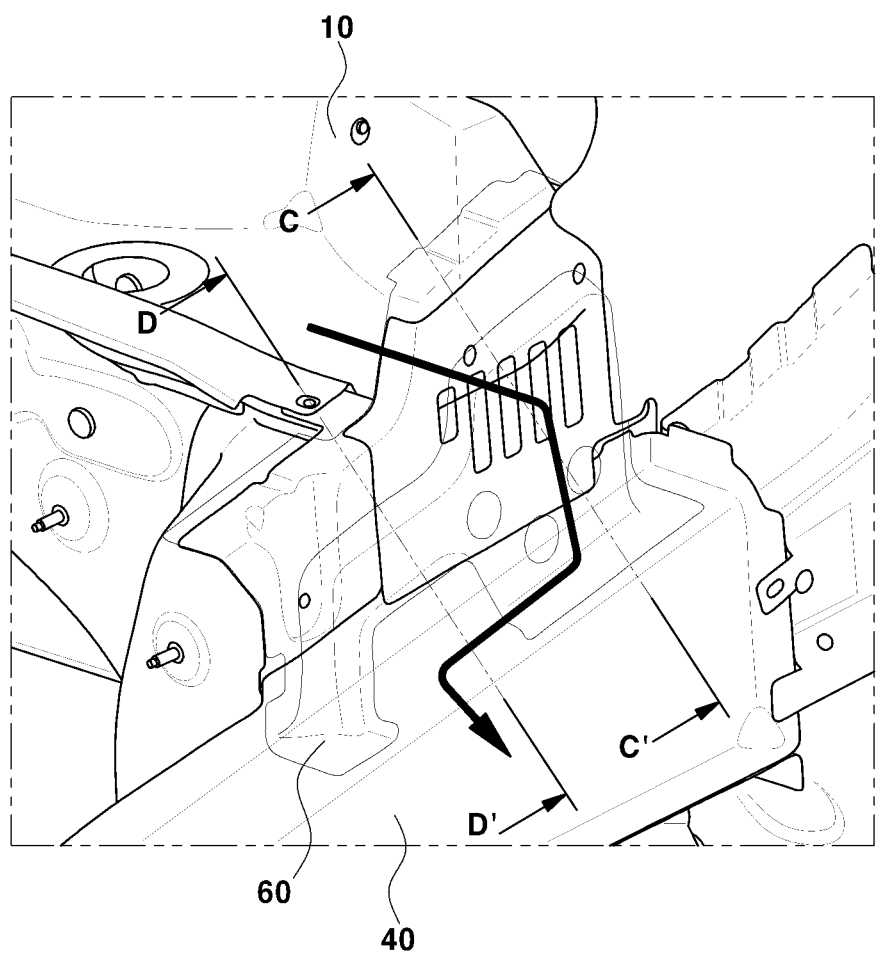
FIG. 7 is a perspective view of the cowl drainage structure according to embodiments of the present invention.
Figure 8:
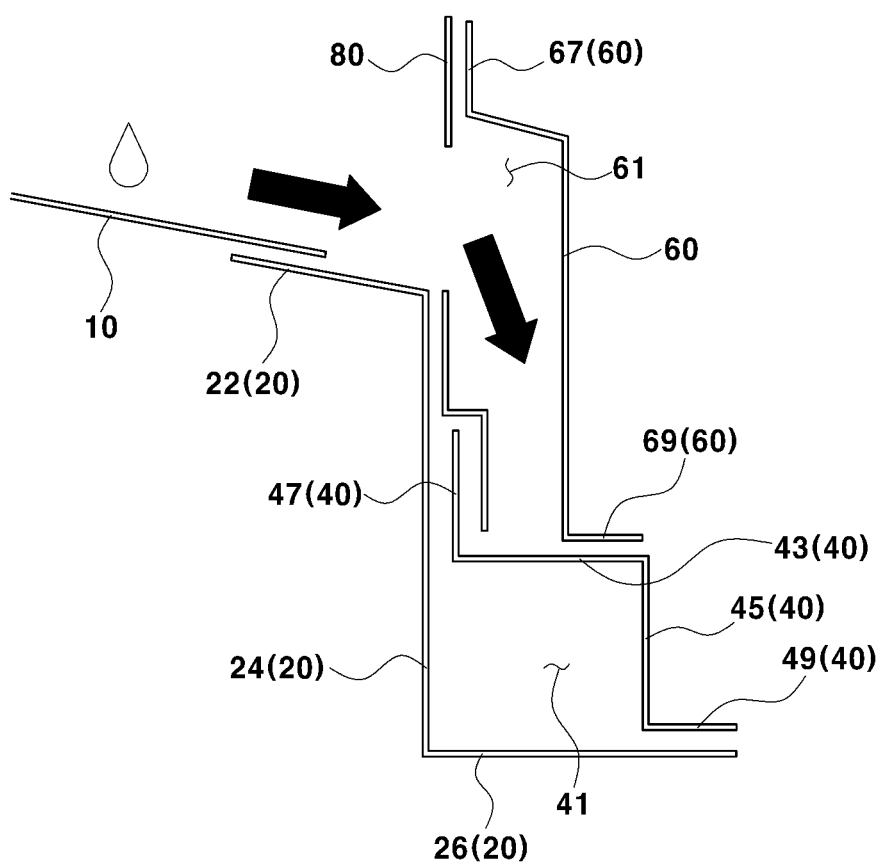
FIG. 8 is a schematic cross-sectional view taken along line C-C' of FIG. 7.
Figure 9:
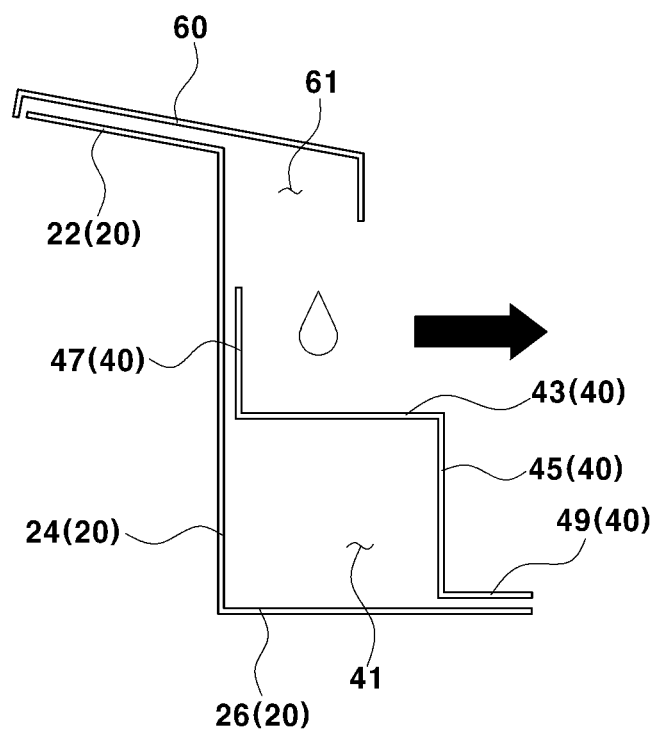
FIG. 9 is a schematic cross-sectional view taken along line D-D' of FIG. 7.

The operation of the cowl drainage structure according to embodiments of the present invention will be described with reference to FIGS. 3, 8 and 9, among the drawings. In FIG. 3, R1 denotes the collision load path, and R2 denotes a drainage path between the cowl 10 and the outside.

Rain water, which flows toward the outside of the vehicle from the cowl 10, flows along the guide portion 22, and is introduced into the space 61 through the openings 82. The rain water in the space 61 falls to the lower outer member 40, and is discharged through the main hole 63 formed in the lower end of the upper outer member 60. When an excessive amount of rain water or the like is introduced, the rain water or the like is also discharged to the outside through the subsidiary holes 65, which are positioned higher than the main hole 63. Since the drainage path through the main hole 63 and the drainage path through the openings 82 are disposed so as to be parallel to each other or to be spaced apart from each other, the cowl drainage structure has excellent ability to alleviate NVH. Furthermore, since there is no need to form a drainage hole in the lower outer member 40, the cowl drainage structure has excellent corrosion resistance and excellent collision resistance.

According to embodiments of the present invention, the fender apron member 550 is divided into an upper group and a lower group. The lower group is composed of the lower inner member 20 and the lower outer member 40, and the upper group is composed of the lower outer member 40, the upper outer member 60 and the lower inner member 20. The upper group serves to perform drainage and contributes to alleviation of NVH, and the lower group contributes to improvement of collision performance.

Since the upper group, which is responsible for drainage, is adapted to freely set the size of the drain hole, the drain performance is excellent. Since the lower group is responsible for collision performance, it is possible to increase the size of the drain hole without influencing collision performance. Furthermore, since the main hole 63 in the upper outer member 60 and the guide portion or the openings 82 are disposed so as to be spaced apart from each other, there is no problem with regard to NVH alleviation performance.

Since there is no need to form a drain hole in the lower group, it is possible to maintain a constant collision load path. Therefore, embodiments of the present invention offer excellent collision performance.

As is apparent from the above description, the cowl drainage structure according to embodiments of the present invention is capable of efficiently preventing corrosion of the fender apron member.

Furthermore, the cowl drainage structure according to embodiments of the present invention is capable of realizing efficient drainage of rain water or the like.

The effects of embodiments of the present invention are not limited to the above-mentioned effects, and other effects of embodiments of the present invention, which are not mentioned above, will be apparent to those skilled in the art.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A cowl drainage structure comprising:
    a lower inner member;
    a lower outer member disposed outside the lower inner member and coupled to the lower inner member so as to define a closed space therebetween; and
    an upper outer member coupled to both the lower outer member and the lower inner member, wherein the upper outer member includes a main hole, and wherein a portion of a space defined between the upper outer member and the lower inner member is configured to communicate fluidly with an outside, wherein the closed space between the lower inner member and the lower outer member is not in fluid communication with the portion of the space defined between the upper outer member and the lower inner member.

2. The cowl drainage structure of claim 1, wherein the main hole is positioned at a lower portion of the upper outer member and is disposed so as to be in contact with the lower outer member.

3. The cowl drainage structure of claim 1, wherein the upper outer member includes a subsidiary hole.

4. The cowl drainage structure of claim 1, further comprising an upper inner member disposed in a portion of an area between the upper outer member and the lower inner member.

5. The cowl drainage structure of claim 4, wherein the upper inner member includes an opening formed therethrough.

6. The cowl drainage structure of claim 4, wherein the upper inner member is coupled to an upper portion of the lower outer member.

7. The cowl drainage structure of claim 1, wherein the lower outer member comprises an upper flange and a lower flange, which are bent at upper and lower ends of the lower outer member and are coupled to the lower inner member.

8. The cowl drainage structure of claim 1, wherein the upper outer member is coupled to the lower outer member.

9. The cowl drainage structure of claim 1, wherein the lower inner member comprises:
    a base portion to which the lower outer member is coupled;
    a vertical portion bent from the base portion and extending upwards; and
    a guide portion bent from the vertical portion and extending upwards.

10. The cowl drainage structure of claim 9, wherein the guide portion is connected to a cowl of a vehicle.

11. A cowl drainage structure comprising:
    a lower inner member connected to a cowl, wherein the lower inner member includes a guide portion configured to receive water from the cowl;
    a lower outer member disposed outside the lower inner member and coupled to the lower inner member so as to define a closed space therebetween; and
    an upper outer member coupled to both the lower outer member and the lower inner member, the upper outer member including a main hole, wherein a space defined between the upper outer member and the lower inner member is configured to communicate with the cowl, wherein the guide portion and the main hole are laterally offset to each other.

12. The cowl drainage structure of claim 11, further comprising an upper inner member disposed between the upper outer member and the lower inner member, the upper inner member including an opening.

13. The cowl drainage structure of claim 12, wherein the upper inner member is coupled to an upper portion of the lower outer member.

14. The cowl drainage structure of claim 11, wherein the lower inner member further comprises:
    a vertical portion extending downward from the guide portion; and a base portion extending from the vertical portion perpendicularly thereto, wherein the guide portion is coupled to the cowl in an overlapping state.

15. The cowl drainage structure of claim 14, wherein the lower outer member comprises:
   an upper flange bent at an upper end of the lower outer member and coupled to the vertical portion; and
   a lower flange bent at a lower end of the lower outer member and coupled to the base portion.

16. The cowl drainage structure of claim 15, wherein the lower outer member comprises a support portion extending between the upper flange and the lower flange.

17. The cowl drainage structure of claim 16, wherein a lower portion of the upper outer member is coupled to the support portion.

18. A vehicle comprising:
   a vehicle body including a hood and a cowl;
   a lower inner member connected to the cowl;
   a lower outer member disposed outside the lower inner member and coupled to the lower inner member so as to define a closed space therebetween; and
   an upper outer member coupled to both the lower outer member and the lower inner member, the upper outer member including a main hole, wherein a space defined between the upper outer member and the lower inner member is configured to communicate with the cowl, wherein the upper outer member includes a subsidiary hole.

19. The vehicle of claim 18, further comprising an upper inner member disposed between the upper outer member and the lower inner member, the upper inner member including an opening.

20. The vehicle of claim 18, wherein:
   the lower inner member comprises:
      a guide portion coupled to the cowl in an overlapping state;
      a vertical portion extending downward from the guide portion; and
      a base portion extending from the vertical portion perpendicularly thereto; and
   the lower outer member comprises:
      an upper flange bent at an upper end of the lower outer member and coupled to the vertical portion;
      a lower flange bent at a lower end of the lower outer member and coupled to the base portion; and
      a support portion extending between the upper flange and the lower flange.

\* \* \* \* \*